US012204436B2

United States Patent
Grönlund

(10) Patent No.: US 12,204,436 B2
(45) Date of Patent: Jan. 21, 2025

(54) INCREMENTAL STACK WALKING

(71) Applicant: Oracle International Corporation, Redwood Shores, CA (US)

(72) Inventor: Markus Sven Grönlund, Tullinge (SE)

(73) Assignee: Oracle International Corporation, Redwood Shores, CA (US)

( * ) Notice: Subject to any disclaimer, the term of this patent is extended or adjusted under 35 U.S.C. 154(b) by 166 days.

(21) Appl. No.: 18/111,423

(22) Filed: Feb. 17, 2023

(65) Prior Publication Data

US 2023/0273871 A1 Aug. 31, 2023

Related U.S. Application Data

(60) Provisional application No. 63/314,801, filed on Feb. 28, 2022.

(51) Int. Cl.
*G06F 11/36* (2006.01)
*G06F 12/0875* (2016.01)

(52) U.S. Cl.
CPC ...... *G06F 11/3636* (2013.01); *G06F 12/0875* (2013.01); *G06F 2212/45* (2013.01)

(58) Field of Classification Search
None
See application file for complete search history.

(56) References Cited

U.S. PATENT DOCUMENTS

| 6,769,004 B2* | 7/2004 | Barrett | G06F 12/0269 711/170 |
| 7,080,368 B2* | 7/2006 | Nistler | G06F 9/449 717/157 |
| 7,386,686 B2* | 6/2008 | Wu | G06F 8/443 711/147 |
| 7,856,538 B2* | 12/2010 | Speirs, II | G06F 13/4059 713/193 |
| 2020/0034150 A1* | 1/2020 | Duveblad | G06F 9/522 |

OTHER PUBLICATIONS

Rudi Martin, "Stackwalking in the CLR", 2008, retrieved from <https://github.com/dotnet/runtime/blob/main/docs/design/coreclr/botr/stackwalking.md> (Year: 2008).*
David Gnedt, "Fast Profiling in the HotSpot Java VM with Incremental Stack Tracing and Partial Safepoints", Dec. 2014, retrieved from <http://mevss.jku.at/wp-content/uploads/2015/01/bachelorthesis-gnedt.pdf> (Year: 2014).*

* cited by examiner

*Primary Examiner* — Marina Lee
(74) *Attorney, Agent, or Firm* — Invoke

(57) ABSTRACT

Techniques for incremental stack walking are disclosed, including: performing a stack walk of a runtime stack, at least by traversing the runtime stack from a current frame to a root frame, to obtain a set of stack walking results; storing a cache of the set of stack walking results; and installing, on the runtime stack, a marker frame that marks a boundary of stack frames represented by the set of stack walking results.

21 Claims, 10 Drawing Sheets

INCREMENTAL STACK WALKING

INCORPORATION BY REFERENCE; DISCLAIMER

The following application is hereby incorporated by reference: U.S. Provisional Patent Application 63/314,801, filed Feb. 28, 2022. The applicant hereby rescinds any disclaimer of claims scope in the parent application(s) or the prosecution history thereof and advise the USPTO that the claims in the application may be broader that any claim in the parent application(s).

TECHNICAL FIELD

The present disclosure relates to memory management in computer systems. In particular, the present disclosure relates to stack walking.

BACKGROUND

To represent temporal program state as a thread of execution runs a program, the runtime environment stores activation records—also known as frames—in a Last-In-First-Out (LIFO) data structure referred to as a stack. Stack walking is the process of inspecting frames on a stack to gain insight into the program state. The runtime environment provides mechanisms for examining the running code and its associated call chain, also known as the calling context. These mechanisms may be invoked as an intrinsic part of normal operations and/or may be invoked by a user seeking to observe the program state (e.g., during debugging).

Historically, stack walking has been associated with exceptional situations. For example, a stack trace provides context when an exception is thrown or a trap occurs. However, for modern runtimes, stack walking is no longer an exceptional occurrence. Developments in observability and profiling leverage the understanding that stack traces provide valuable structure that is missing from typical runtime observability and monitoring techniques, which tend to be based on flat data models such as counters and aggregates. Those techniques can help detect a problem, but stack traces are important for understanding what is causing the problem.

A typical stack walking approach starts from the current frame and traverses the full stack toward the first (oldest) frame. For a stack of size or "depth" n, this approach is linear and has a runtime cost of O(n). Accordingly, stack walking typically encounters performance problems as the depth of the stack increases. Meanwhile, modern software relies more and more on libraries and third-party code that can increase the stack depth considerably. A common workaround is to cap the number of frames processed (i.e., walking only a certain number of the most recent frames, such as the most recent 64 frames or some other cap value). Unfortunately, capped stack traces are less useful, because the most recent frames tend to reflect libraries and frameworks—not the user code sought to be inspected. With deeper stacks, users require deeper stack traces.

Because stack walking has historically been associated with exceptional situations, stack walking performance has not been prioritized in runtime environment development. Thus, there is a disconnect between increasingly demanding requirements related to profiling and monitoring—more specifically, production-time profiling becoming more mainstream—and the linear runtime costs of typical stack walking approaches. Observability overhead has become a differentiating factor between different modern runtime environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. ARCHITECTURAL OVERVIEW
   2.1. EXAMPLE ARCHITECTURE
   2.2. EXAMPLE CLASS FILE STRUCTURE
   2.3. EXAMPLE VIRTUAL MACHINE ARCHITECTURE
   2.4. LOADING, LINKING, AND INITIALIZING
3. EXAMPLE RUNTIME STACK
4. INCREMENTAL STACK WALKING
5. STACK UNWINDING
6. PERFORMANCE COMPARISON

7. COMPUTER NETWORKS AND CLOUD NETWORKS
8. HARDWARE OVERVIEW
9. MISCELLANEOUS; EXTENSIONS

1. General Overview

One or more embodiments leverage the observation that except for the most current frame, most frames are effectively immutable. Most of a program's runtime behavior exercises only a smaller portion of its static call graph, and the exercised parts are frequently revisited during the program's lifetime. Consequently, stack walking tends to involve redundant work, i.e., often discovering the same calling contexts again and again. Such redundant work is well-suited for caching.

To improve stack walking performance, one or more embodiments cache prior results and install one or more marker frames delineating where frames have already been processed. Thus, while the initial stack walk has a cost of O(n), a subsequent stack walk has a cost of O(d)+O(1), where d is the number of new frames installed since the previous stack walk and O(1) is the fixed cost to retrieve the cached results. This approach is referred to herein as "incremental stack walking," because subsequent stack walks may be performed incrementally without traversing the entire stack. Thus, in addition to improving stack walking performance generally, incremental stack walking supports deeper stack traces, because the costs associated with stack walking are amortized over time.

One or more embodiments described in this Specification and/or recited in the claims may not be included in this General Overview section.

2. Architectural Overview 2.1. Example Architecture

Figure 1:
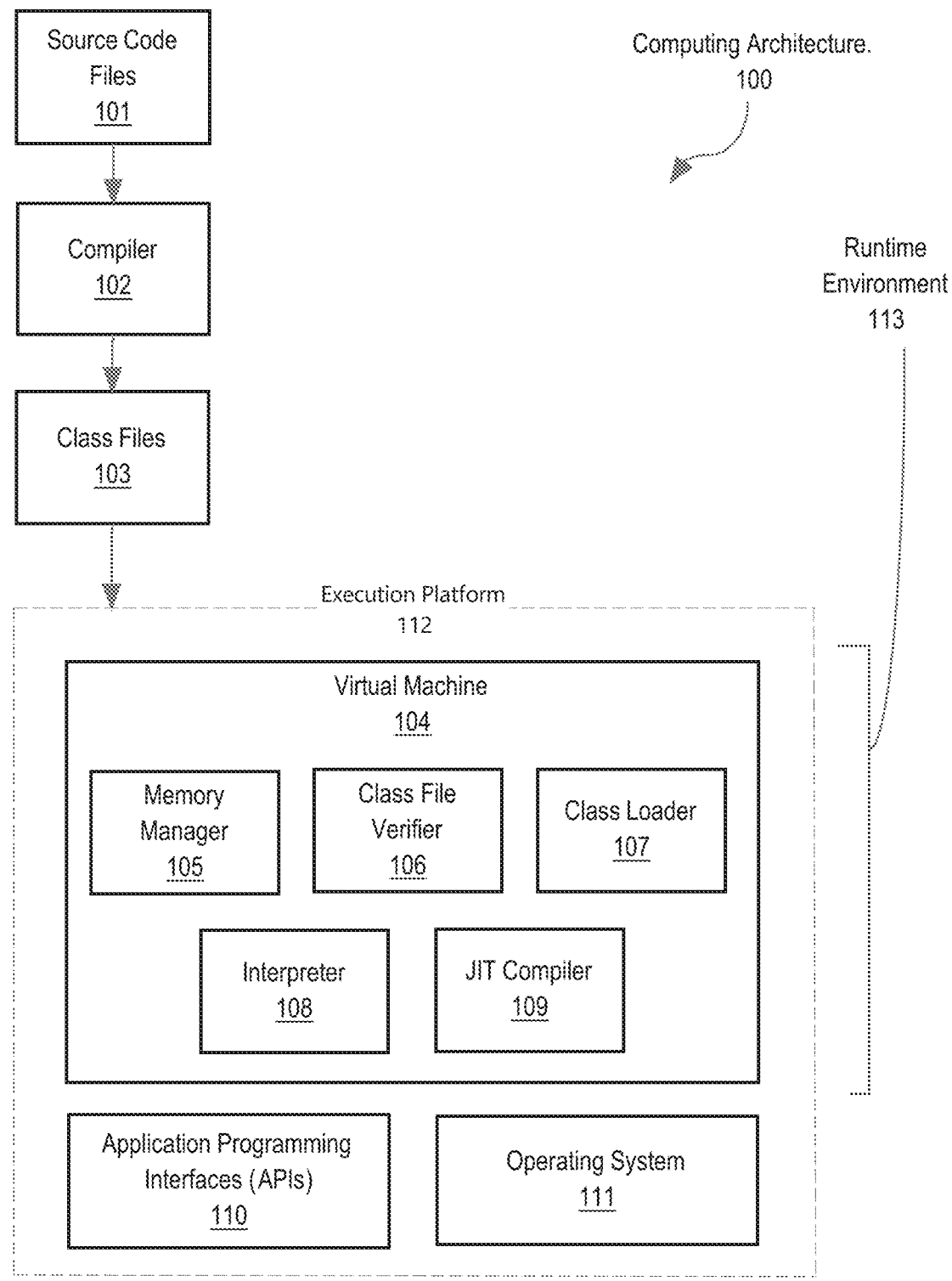
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.2. Example Class File Structure

Figure 2:
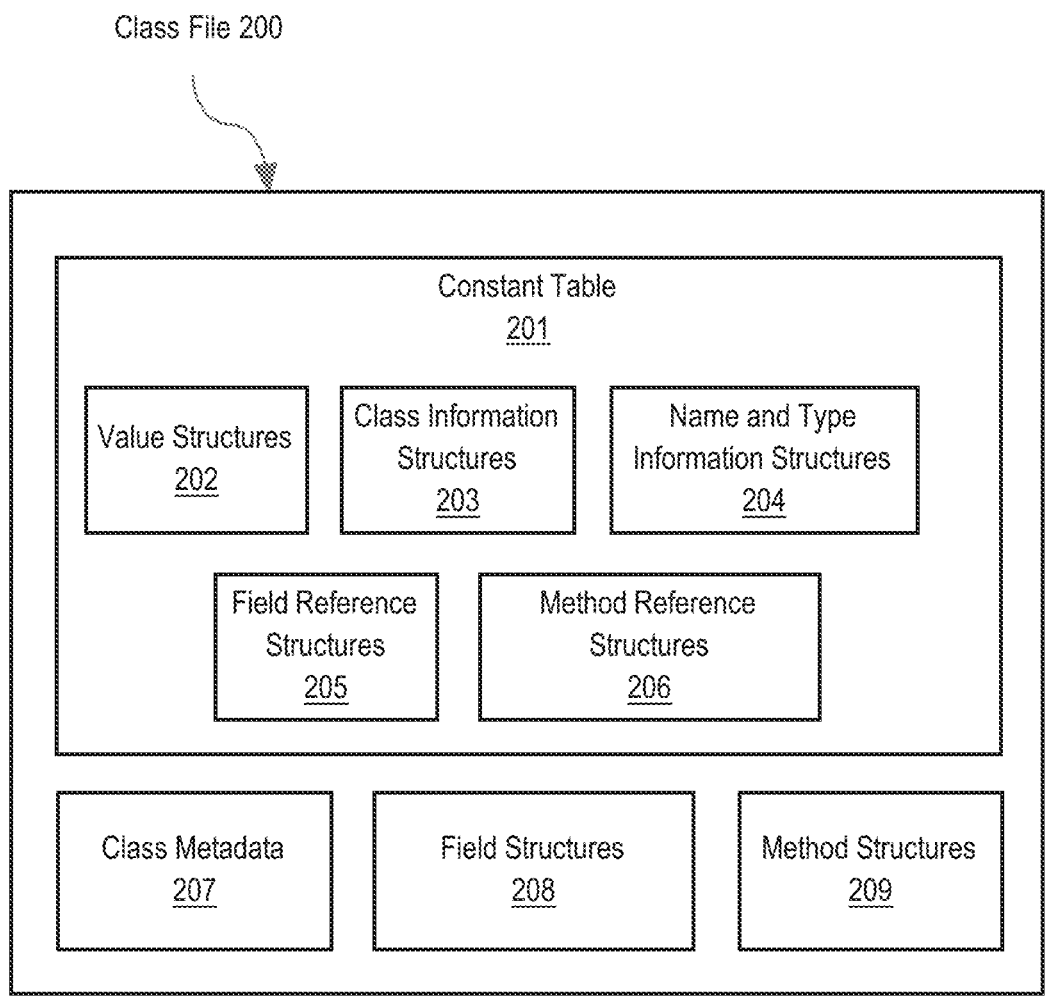
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { ... }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13( ) {
    return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3. Example Virtual Machine Architecture

Figure 3:
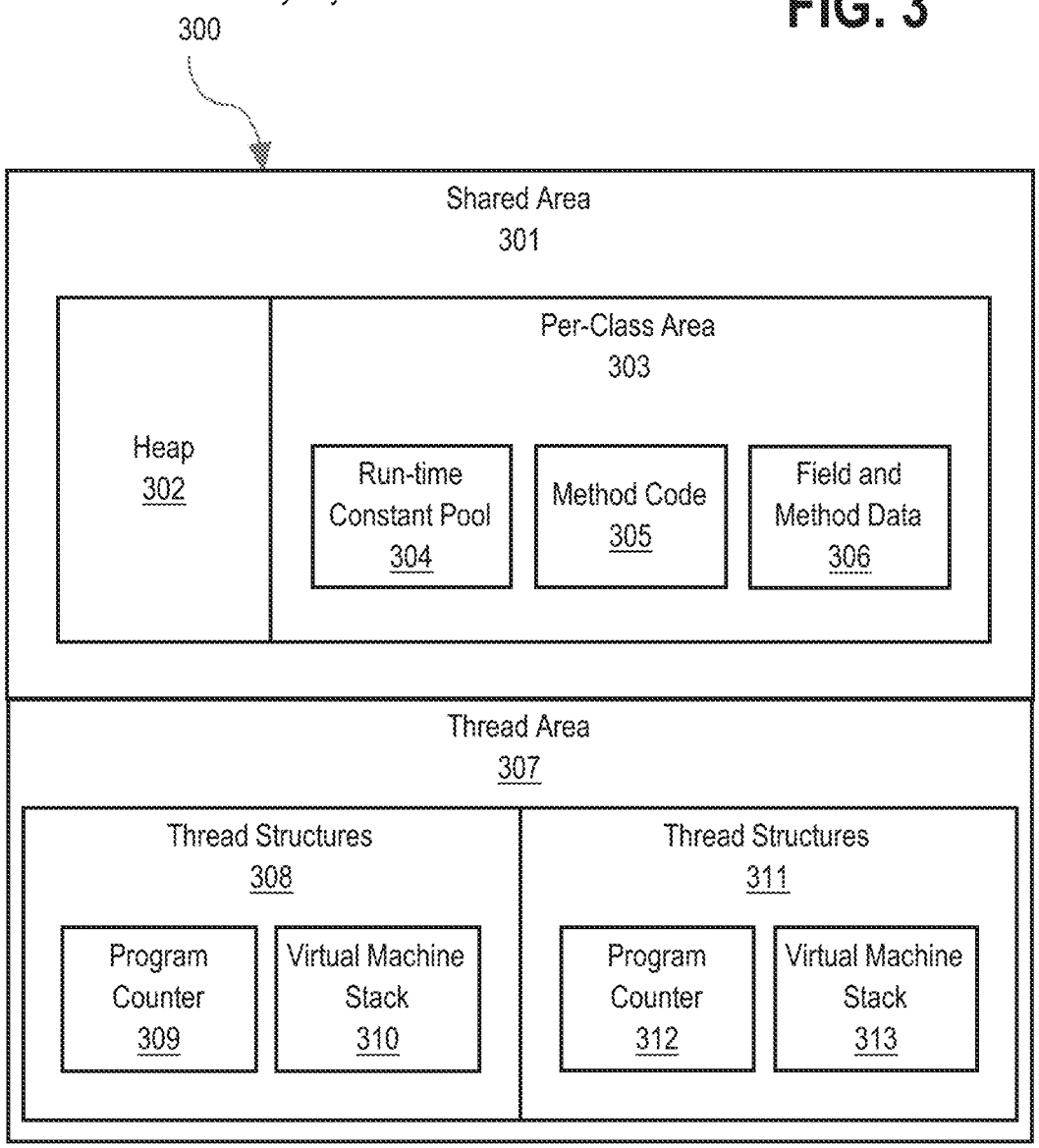
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
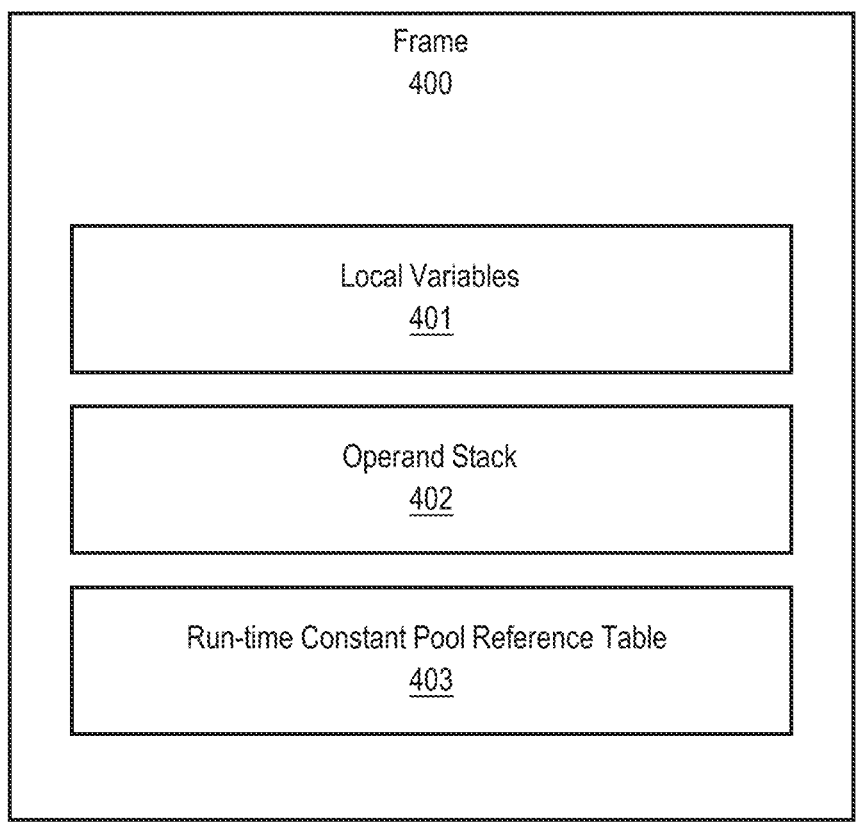
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4. Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Example Runtime Stack

Figure 5A:
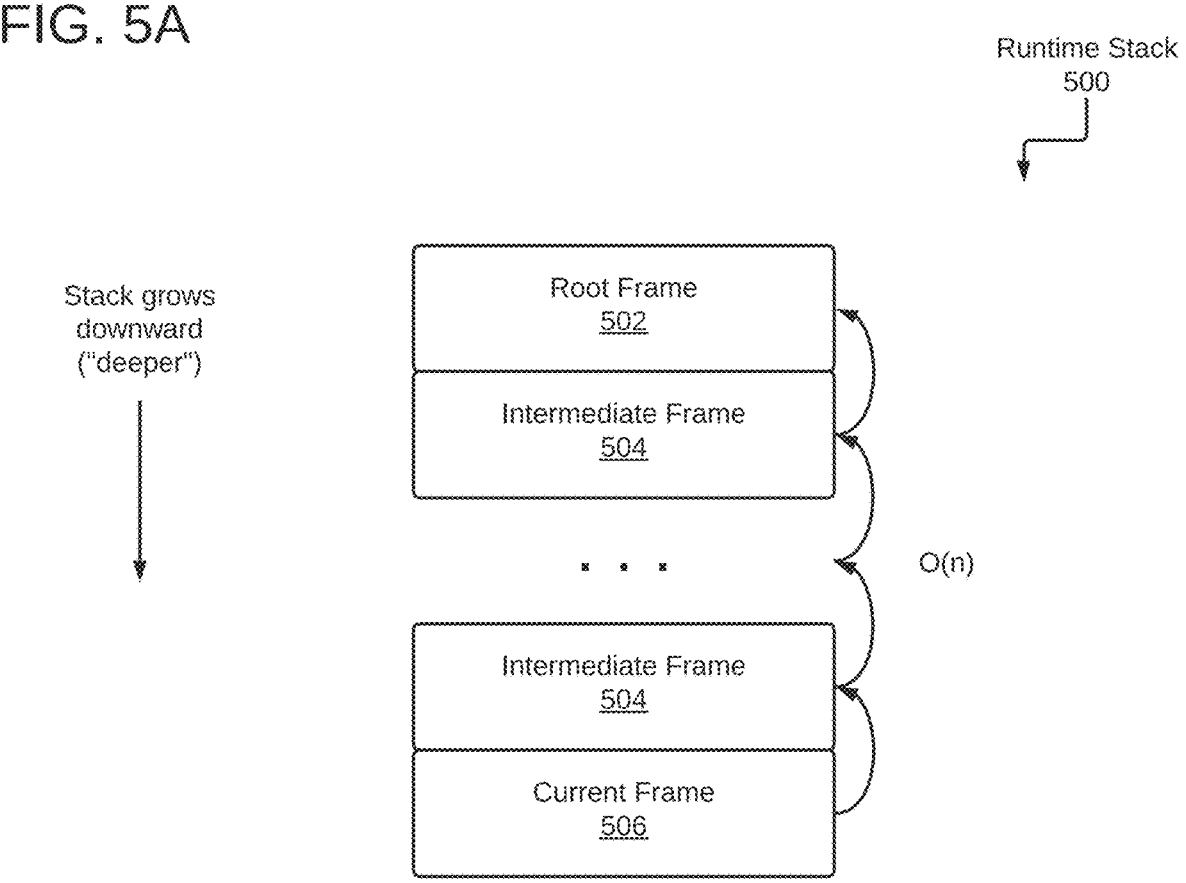
FIGS. 5A-5B show block diagrams that illustrate an example of a runtime stack in accordance with one or more embodiments.
Figure 5B:
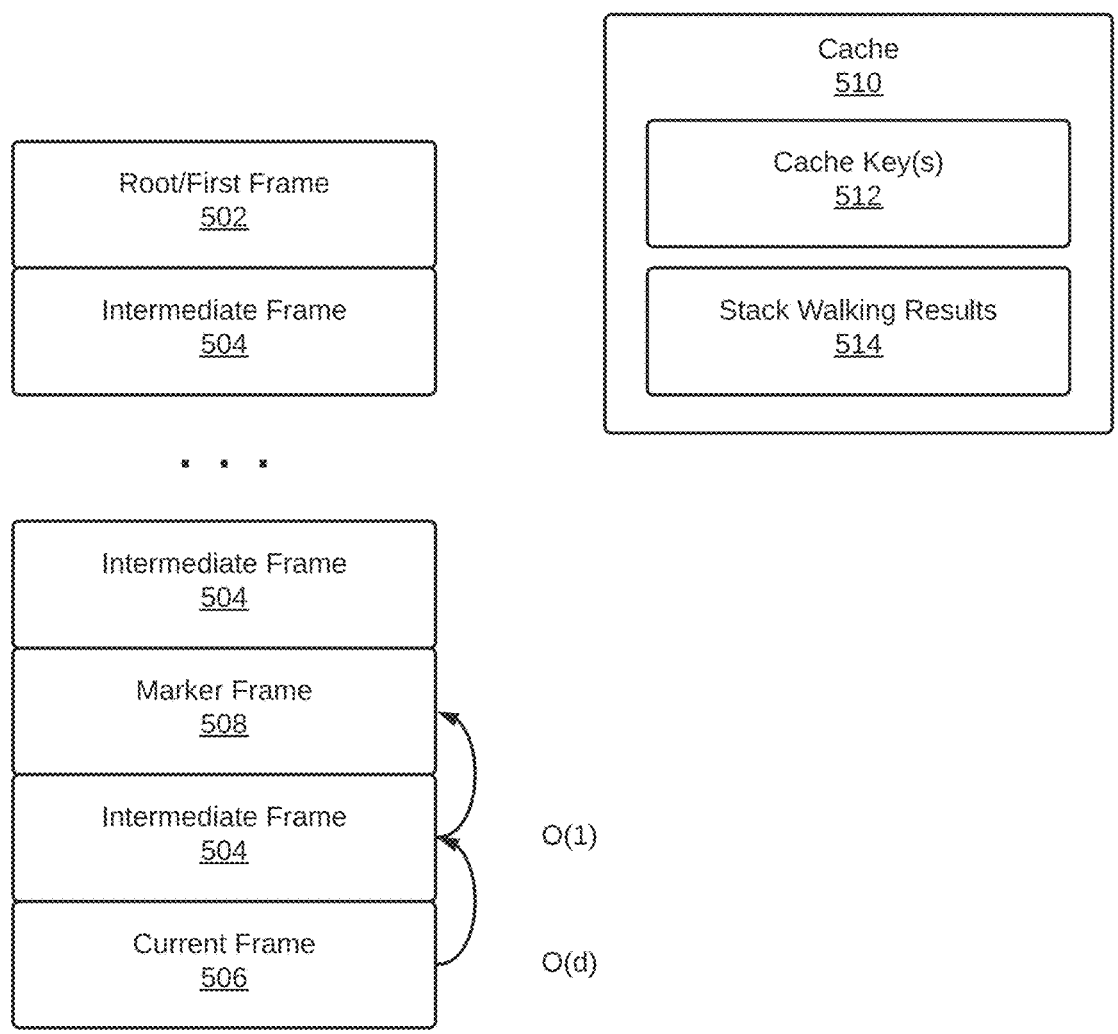

FIG. 5A-5B illustrate an example of a runtime stack 500 in accordance with one or more embodiments. As illustrated in FIGS. 5A-5B, the runtime stack 500 includes a root frame 502, one or more intermediate frames 504, a current frame 506, one or more marker frames 508, a cache 510, one or more cache keys 512, and one or more sets of stack walking results 514. In one or more embodiments, the runtime stack 500 may include more or fewer components than the components illustrated in FIGS. 5A-5B. The components illustrated in FIGS. 5A-5B may be local to or remote from each other. The components illustrated in FIGS. 5A-5B may be implemented in software and/or hardware. Each component may be distributed over multiple applications and/or machines. Multiple components may be combined into one application and/or machine. Operations described with respect to one component may instead be performed by another component.

The root frame 502 is the oldest (or "first") frame in the runtime stack 500. In FIG. 5A, the runtime stack 500 is visualized as filling from top to bottom (thus growing "deeper"), and the root frame 502 is the "top" of the runtime stack 500. If the runtime stack 500 were instead visualized as filling from bottom to top, then the root frame 502 would be the "bottom" of the runtime stack 500.

The current frame 506 is the newest frame in the runtime stack 500. In FIG. 5A, the runtime stack 500 is visualized as filling from top to bottom, and the current frame 506 is the "bottom" of the runtime stack 500. If the runtime stack 500 were instead visualized as filling from bottom to top, then the current frame 506 would be the "top" of the runtime stack 500.

Intermediate frames 504 are frames that were installed on the runtime stack 500 after the root frame 502 and before the current frame 506. The runtime stack 500 may include many hundreds or even thousands of frames including the root frame 502, intermediate frames 504, and the current frame 506.

As shown in FIG. 5A, a full stack walk has a runtime cost of O(n), where n is the total number of frames on the runtime stack 500. As the size of the runtime stack increases (i.e., the stack grows "deeper"), that cost increases linearly. Without optimization techniques described herein, that cost is incurred each time a stack trace is performed.

Turning to FIG. 5B, using techniques described herein, the runtime environment (not shown) may be configured to store stack walking results 514 in a cache 510. The cache 510 includes one or more cache keys 512, each of which may be mapped to one or more respective sets of stack walking results 514. A cache key 512 is associated with a particular marker frame 508. In an embodiment, the cache key 512 is a representation of the calling context state on the runtime stack 500, i.e., all frames from the root frame 502, up to and including the marker frame 508. For example, a folded representation of the calling context state (e.g., a hash value or other kind of key value) may be based, at least in part, on the return addresses of the frames. The cache key 512 uniquely identifies that state by representing, for example, one or more unique properties of the frames themselves and/or edges between the frames. As such, the cache key 512 is a function of the calling context, represented by frames on the runtime stack 500. With this approach, distinct threads may map the same cache key 512, if they have identical calling contexts (running the same code segment), thus allowing for cache buildup and reuse across threads. The cache key 512 itself is not necessarily shared across the entire runtime environment; multiple threads may produce the same value of respective cache keys 512.

In an embodiment, the runtime environment is configured to use the cache key 512 associated with the marker frame 508 to perform a lookup of the cached stack walking results 514 corresponding to that specific location in the runtime stack 500. In addition, the runtime environment may use the cache key 512 itself to dynamically recalculate the cache key 512 for another position in the runtime stack 500. Specifically, the runtime environment may be configured to generate another cache key 512, to incrementally account for frames installed and/or removed on the runtime stack 500 since the cache key 512 was last calculated. Thus, when the marker frame 508 is encountered during a stack walk, the cache key 512 allows for a lookup of the cached stack walking results 514 corresponding to that location in the runtime stack 500. The runtime stack 500 may include multiple marker frames 508, each corresponding to a different set of stack walking results 514.

As discussed above, the cache key 512 is a value that represents the total state of the runtime stack 500, up to and including the marker frame 500. As the runtime stack 500 changes over time, the runtime environment may maintain a running value (e.g., an incrementally updated hash value) corresponding to that state. Thus, the cache 510 may store multiple sets of stack walking results 514 corresponding to different code paths. Even after unwinding the runtime stack 500, if the state returns to a state for which a cached set of stack walking results 514 already exists, those cached results may be reused. Over time, the cache 510 may effectively grow into a "library" of cached results. Such a library may be particularly useful, for example, in a multithreaded environment where different threads may follow the same code paths at different times. A set of stack walking results 514 generated by one thread may be available to another thread, thus resulting in significant performance improvements across the entire multithreaded environment. To help preserve system resources, the system may be configured to store up to a threshold number and/or age (e.g., measured in seconds or some other time increment) of stack walking results 514 for each thread and/or for the runtime environment as a whole.

During runtime, the identity of the current frame 506 changes. Upon installing a new frame on the runtime stack 500, the frame that was previously the current frame 506 becomes an intermediate frame 504. Upon removing or "unwinding" the current frame 506 from the runtime stack 500, the most recent intermediate frame 504 becomes the current frame 506.

As shown in FIG. 5B and described in further detail below, incremental stack walking can reduce the runtime cost of a stack walk. Specifically, the runtime cost of incremental stack walking is $O(d)+O(1)$, where d is the number of frames installed on the runtime stack 500 since the most recent stack walking results 514 were stored in the cache 510. $O(1)$ is the runtime cost to lookup the cached stack walking results 514.

4. Incremental Stack Walking

Figure 6A:
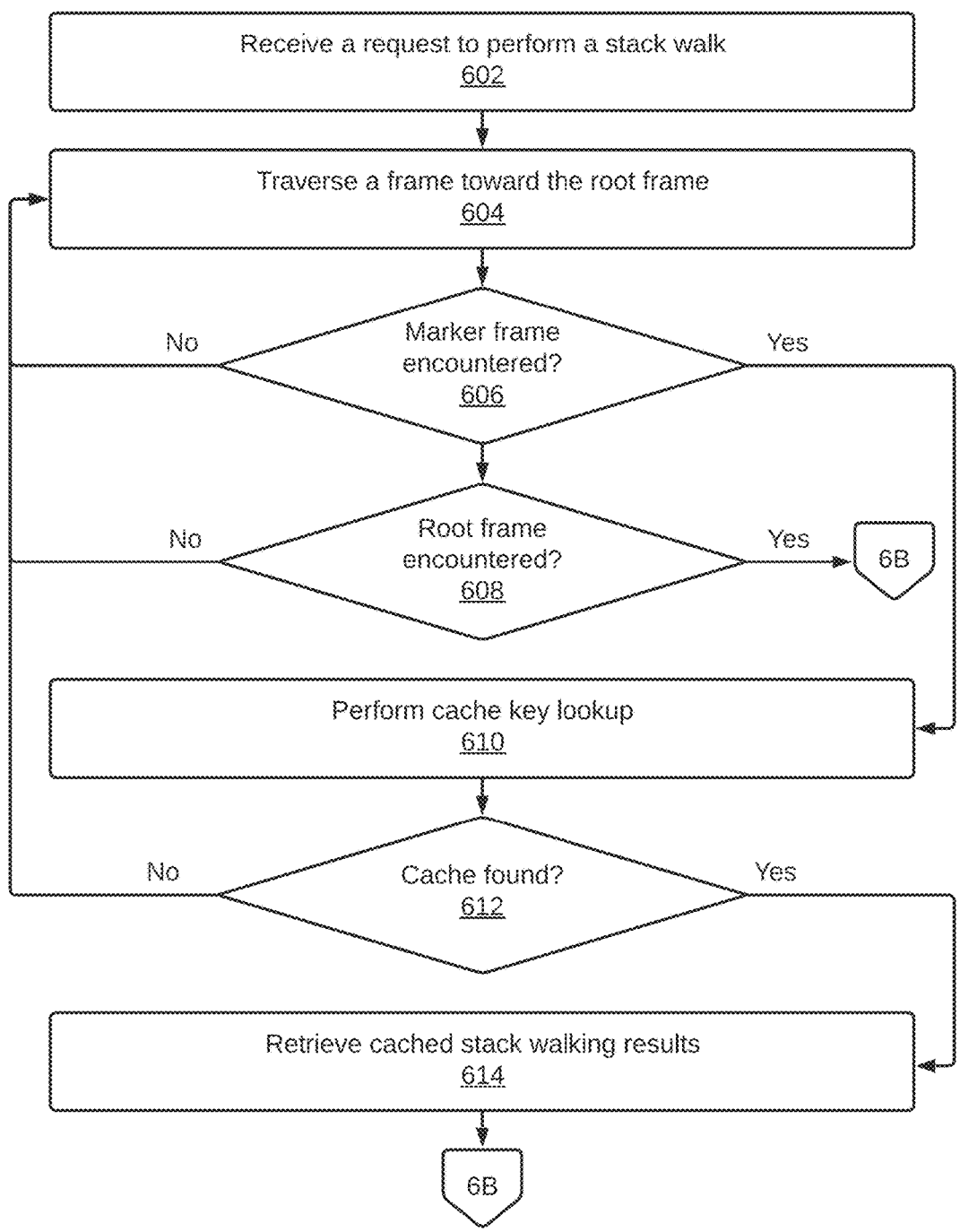
FIGS. 6A-6B illustrate an example set of operations for incremental stack walking in accordance with one or more embodiments.
Figure 6B:
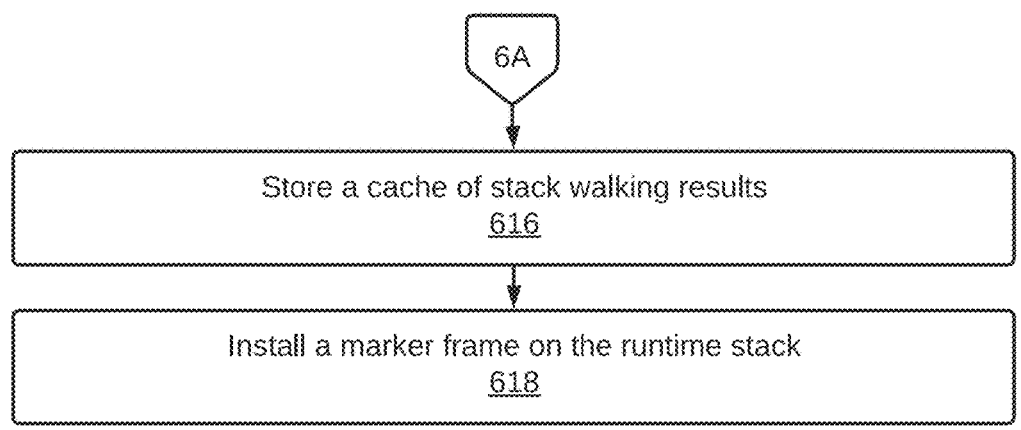

FIGS. 6A-6B illustrate an example set of operations for incremental stack walking in accordance with one or more embodiments. One or more operations illustrated in FIGS. 6A-6B may be modified, rearranged, or omitted all together. Accordingly, the particular sequence of operations illustrated in FIGS. 6A-6B should not be construed as limiting the scope of one or more embodiments.

In an embodiment, a runtime environment receives a request to perform a stack walk (Operation 602). For example, user code may include an instruction to perform a stack trace. Alternatively or additionally, the runtime environment may be configured to perform stack traces periodically and/or upon detecting one or more trigger conditions (e.g., an exception, a fault, the stack depth increasing at an unexpected rate, the stack depth reaching a threshold number of frames, etc.).

Responsive to the request to perform a stack walk, the runtime environment begins traversing the runtime stack (Operation 604) starting from the current frame and iterating toward the root frame. At each frame traversed, the runtime environment determines whether that frame is a marker frame (Operation 606). If the frame is not a marker frame, the runtime environment determines whether the frame is the root frame (Operation 608). If the frame is not the root frame, the runtime environment continues traversing the runtime stack. If the frame is the root frame, the traversal is complete and the runtime environment may cache the stack walking results obtained during the traversal, as described in further detail below.

Returning to Operation 606, if a marker frame is encountered, the runtime environment may perform a cache key lookup (Operation 610). A cache key lookup uses a key uniquely corresponding to the state of the runtime stack at the marker frame's location, to determine whether a corresponding cached set of stack walking results is available. As described in further detail below, during stack unwinding, there may be some circumstances where a cache corresponding to the marker frame is not available. In an embodiment, to perform the cache key lookup, the runtime environment generates a cache key (for example, a state-specific hash value) uniquely corresponding to the state of the runtime stack at the marker frame's location and looks up the cache key in a cache table.

If there is no cached set of stack walking results associated with the cache key, then a cache miss occurs. In this situation, as discussed in further detail below, the runtime environment continues to traverse the runtime stack as if it had not encountered the marker frame and builds up a set of stack walking results starting from the frame where the traversal originated. Building and caching the set of stack walking results can reduce the runtime cost of a subsequent stack walk. An example of a performance comparison according to an embodiment is described below.

If the hash value (or another kind of cache key) is associated with a corresponding cached set of stack walking results, the runtime environment retrieves the cached set of stack walking results (Operation 614). Because the marker frame marks the boundary of frames that were previously traversed and for which the cache holds the prior stack walking results, it is not necessary to continue traversing the runtime stack. The cached results, plus the results corresponding to any newer frames that were traversed in the stack walk, represent a full stack trace without having to incur the O(n) cost of a full stack walk.

In an embodiment, if the stack walk traversed any frames for which results were not already cached (for example, frames installed on the runtime stack after the marker frame was installed, or if no marker frame was encountered at all, or if no cache corresponding to the marker frame was found), the runtime environment stores a cache of the stack walking results (Operation 616). If a marker frame with a corresponding cache was encountered, the runtime environment may store only an incremental cache corresponding to the newly traversed frames. Alternatively, the runtime environment may append the incremental results to the existing cached results. The runtime environment may install a marker frame on the runtime stack (Operation 618) indicating that cached results are available for that location in the runtime stack. The runtime environment may further generate a cache key corresponding to the marker frame, to facilitate future cache key lookups.

5. Stack Unwinding

Figure 7:
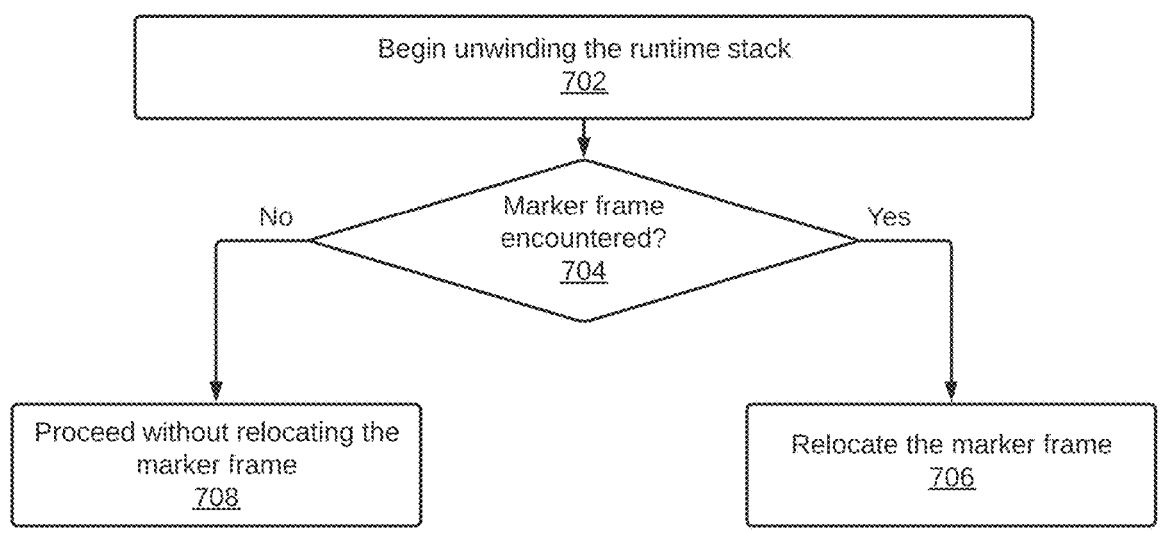
FIG. 7 illustrates an example set of operations for stack unwinding in accordance with one or more embodiments.

FIG. 7 illustrates an example set of operations for stack unwinding in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

In an embodiment, at some point after installing a marker frame, the runtime environment begins unwinding the runtime stack (Operation 702). For example, as function calls terminate, the corresponding stack frame(s) is/are removed from the runtime stack. While unwinding the runtime stack, the runtime environment may encounter a marker frame (Operation 704). If a marker frame is encountered, the runtime environment may relocate the marker frame (Operation 706). Specifically, the runtime environment may relocate the marker frame to an older position in the runtime stack. The runtime environment may relocate the marker frame by a certain number of positions at a time (e.g., one position at a time, or by another distance greater than one to reduce overhead). In an embodiment, the default distance to relocate the marker frame is one frame but may be configurable so as to allow for performance tuning. Alternatively or additionally, the runtime environment may compute the distance dynamically, based on observed performance (e.g., when a performance metric—such as compute cycles, time, etc.—falls below a predetermined threshold value). For example, a user may determine that relocating the marker frame in increments of 25 positions is sufficient for their purposes. The runtime environment may determine that 25 positions is too expensive and dynamically adjust the distance to a higher number (e.g., 35). A shorter distance increases the speed of subsequent stack walks but incurs more immediate overhead as the cache key is recalculated on each unwind.

If the cache key is based, at least in part, on the marker frame's location in the runtime stack, then the runtime environment may eventually relocate the marker frame to a location having a corresponding cached set of stack walking results. Alternatively or additionally, the runtime environment may install a new marker frame each time a stack trace is performed. In this approach, upon encountering a marker frame while unwinding the runtime stack, the runtime environment may discard the marker frame (not shown). Returning to Operation 704, if no marker frame is encountered while unwinding the runtime stack, the runtime environment may proceed with unwinding the runtime stack without relocating any marker frame that was not encountered (Operation 708).

6. Performance Comparison

As discussed above, incremental stack walking can improve stack walking performance considerably. In one example, three stack walks are performed in sequence. The program continues to execute after the first stack walk, pushing three newer frames onto the runtime stack before the second stack walk. The third stack walk is performed immediately after the second stack walk. Table 1, below, illustrates the performance difference between (a) a typical stack walking approach that traverses the full runtime stack each time and (b) incremental stack walking using a marker frame as described herein. In Table 1, the value in each cell represents the cumulative performance of each approach.

TABLE 1

Performance Comparison

| Walks | Typical Approach | Incremental Stack Walking |
|---|---|---|
| Initial | O(n) | O(n) |
| Second | O(n) + O(n + 3) | O(n) + O(3 + 1) |
| Third | O(n) + O(n + 3) + O(n + 3) | O(n) + O(3 + 1) + O(1) |

From a performance perspective, with incremental stack walking, the stack depth appears to have collapsed or shrunk in comparison to each prior walk. Previously traversed frames do not need to be traversed again, thus providing a dynamic reduction in the number of frames the runtime environment must traverse in subsequent stack walks.

7. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 8:
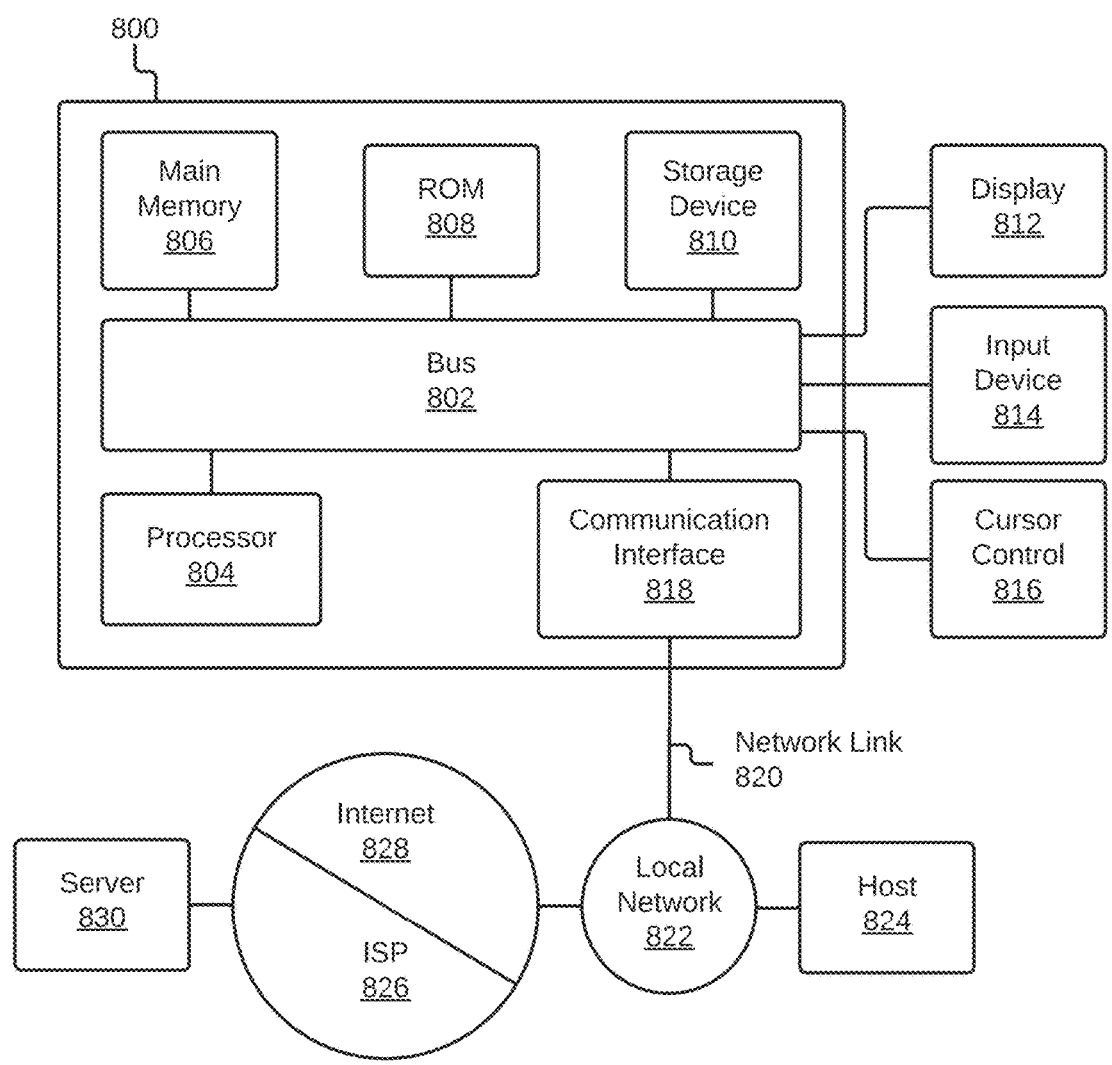
FIG. 8 shows a block diagram that illustrates a computer system in accordance with one or more embodiments.

For example, FIG. 8 is a block diagram that illustrates a computer system 800 upon which one or more embodiments of the invention may be implemented. The computer system 800 includes a bus 802 or other communication mechanism for communicating information, and a hardware processor 804 coupled with bus 802 for processing information. The hardware processor 804 may be, for example, a general-purpose microprocessor.

The computer system 800 also includes a main memory 806, such as a random access memory (RAM) or other dynamic storage device, coupled to bus 802 for storing information and instructions to be executed by processor 804. The main memory 806 also may be used for storing temporary variables or other intermediate information during execution of instructions to be executed by processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a cathode ray tube (CRT), for displaying information to a computer user. An input device 814, including alphanumeric and other keys, is coupled to the bus 802 for communicating information and command selections to the processor 804. Another type of user input device is cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement techniques described herein using customized hard-wired logic, one or more ASICs or FPGAs, firmware, and/or program logic which in combination with the computer system 800 causes or programs the computer system 800 to be a special-purpose machine. In one or more embodiments, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 810. Volatile media includes dynamic memory, such as the main memory 806. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 802. Transmission media can also take the form of acoustic or light waves, such as those generated during radio frequency (RF) and infrared data communications.

Various forms of media may be involved in carrying one or more sequences of one or more instructions to the processor 804 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 800 can receive the data on the telephone line or other communications medium and use an infrared transmitter to convert the data to an infrared signal. An infrared detector can receive the data carried in the infrared signal and appropriate circuitry can place the data on the bus 802. The bus 802 carries the data to the main memory 806, from which the processor 804 retrieves and executes the instructions. The instructions received by the main memory 806 may optionally be stored on the storage device 810, either before or after execution by processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. As another example, the communication interface 818 may be a local area network (LAN) card configured to provide a data communication connection to a compatible LAN. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through a local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), network link 820, and communication interface 818. In the Internet example, a server 830 might transmit a requested code for an application program through the Internet 828, ISP 826, local network 822, and communication interface 818.

The received code may be executed by processor 804 as it is received, and/or may be stored in the storage device 810 or other non-volatile storage for later execution.

9. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
    performing a first stack walk of a runtime stack, at least by traversing the runtime stack from a first current frame to a root frame, to obtain a first set of stack walking results;
    storing a first cache of the first set of stack walking results;
    installing, on the runtime stack, a first marker frame that marks a first boundary of stack frames represented by the first set of stack walking results.

2. The one or more non-transitory machine-readable media of claim 1, the operations further comprising:
    subsequent to performing the first stalk walk of the runtime stack, performing a second stack walk of the runtime stack;
    while traversing the runtime stack during the second stack walk, encountering the first marker frame;
    responsive to encountering the first marker frame, retrieving the first cache of the first set of stack walking results;
    completing the second stack walk without traversing at least one frame represented by the first set of stack walking results.

3. The one or more non-transitory machine-readable media of claim 2, the operations further comprising:
    storing, in a cache lookup table, a hash value corresponding to the first marker frame;
    responsive to encountering the first marker frame, performing a cache table lookup of the hash value corresponding to the first marker frame, to obtain the first cache of the first set of stack walking results.

4. The one or more non-transitory machine-readable media of claim 2, the operations further comprising:
    storing a second cache of a second set of stack walking results obtained in the second stack walk, the second set of stack walking results representing at least one frame that is more recent than any frame traversed in the first stack walk;
    installing, on the runtime stack, a second marker frame that marks a second boundary of stack frames represented by the second set of stack walking results.

5. The one or more non-transitory machine-readable media of claim 4, the operations further comprising:
    subsequent to performing the second stalk walk of the runtime stack, performing a third stack walk of the runtime stack;
    while traversing the runtime stack during the third stack walk, encountering the second marker frame;
    responsive to encountering the second marker frame, retrieving the second cache of the second set of stack walking results;

completing the third stack walk without traversing at least one frame represented by the second set of stack walking results.

6. The one or more non-transitory machine-readable media of claim 1, the operations further comprising:
subsequent to performing the first stack walk of the runtime stack, unwinding a portion of the runtime stack;
while unwinding the portion of the runtime stack, encountering the first marker frame;
responsive to encountering the first marker frame, relocating the first marker frame to an older position in the runtime stack.

7. The one or more non-transitory machine-readable media of claim 6, the operations further comprising:
subsequent to relocating the first marker frame to the older position in the runtime stack, performing a second stack walk of the runtime stack;
while traversing the runtime stack during the second stack walk, encountering the first marker frame;
responsive to encountering the first marker frame, determining that no cache corresponding to the older position in the runtime stack is available;
responsive to determining that no cache corresponding to the older position in the runtime stack is available, completing the second stack walk at least by traversing the runtime stack from the older position in the runtime stack to the root frame.

8. A system comprising:
at least one device comprising one or more hardware processors,
the system being configured to perform operations comprising:
performing a first stack walk of a runtime stack, at least by traversing the runtime stack from a first current frame to a root frame, to obtain a first set of stack walking results;
storing a first cache of the first set of stack walking results;
installing, on the runtime stack, a first marker frame that marks a first boundary of stack frames represented by the first set of stack walking results.

9. The system of claim 8, the operations further comprising:
subsequent to performing the first stalk walk of the runtime stack, performing a second stack walk of the runtime stack;
while traversing the runtime stack during the second stack walk, encountering the first marker frame;
responsive to encountering the first marker frame, retrieving the first cache of the first set of stack walking results;
completing the second stack walk without traversing at least one frame represented by the first set of stack walking results.

10. The system of claim 9, the operations further comprising:
storing, in a cache lookup table, a hash value corresponding to the first marker frame;
responsive to encountering the first marker frame, performing a cache table lookup of the hash value corresponding to the first marker frame, to obtain the first cache of the first set of stack walking results.

11. The system of claim 9, the operations further comprising:
storing a second cache of a second set of stack walking results obtained in the second stack walk, the second set of stack walking results representing at least one frame that is more recent than any frame traversed in the first stack walk;
installing, on the runtime stack, a second marker frame that marks a second boundary of stack frames represented by the second set of stack walking results.

12. The system of claim 11, the operations further comprising:
subsequent to performing the second stalk walk of the runtime stack, performing a third stack walk of the runtime stack;
while traversing the runtime stack during the third stack walk, encountering the second marker frame;
responsive to encountering the second marker frame, retrieving the second cache of the second set of stack walking results;
completing the third stack walk without traversing at least one frame represented by the second set of stack walking results.

13. The system of claim 8, the operations further comprising:
subsequent to performing the first stack walk of the runtime stack, unwinding a portion of the runtime stack;
while unwinding the portion of the runtime stack, encountering the first marker frame;
responsive to encountering the first marker frame, relocating the first marker frame to an older position in the runtime stack.

14. The system of claim 13, the operations further comprising:
subsequent to relocating the first marker frame to the older position in the runtime stack, performing a second stack walk of the runtime stack;
while traversing the runtime stack during the second stack walk, encountering the first marker frame;
responsive to encountering the first marker frame, determining that no cache corresponding to the older position in the runtime stack is available;
responsive to determining that no cache corresponding to the older position in the runtime stack is available, completing the second stack walk at least by traversing the runtime stack from the older position in the runtime stack to the root frame.

15. A method comprising:
performing a first stack walk of a runtime stack, at least by traversing the runtime stack from a first current frame to a root frame, to obtain a first set of stack walking results;
storing a first cache of the first set of stack walking results;
installing, on the runtime stack, a first marker frame that marks a first boundary of stack frames represented by the first set of stack walking results,
wherein the method is performed by at least device comprising one or more hardware processors.

16. The method of claim 15, further comprising:
subsequent to performing the first stalk walk of the runtime stack, performing a second stack walk of the runtime stack;
while traversing the runtime stack during the second stack walk, encountering the first marker frame;
responsive to encountering the first marker frame, retrieving the first cache of the first set of stack walking results;
completing the second stack walk without traversing at least one frame represented by the first set of stack walking results.

17. The method of claim 16, further comprising:
storing, in a cache lookup table, a hash value corresponding to the first marker frame;
responsive to encountering the first marker frame, performing a cache table lookup of the hash value corresponding to the first marker frame, to obtain the first cache of the first set of stack walking results.

18. The method of claim 16, further comprising:
storing a second cache of a second set of stack walking results obtained in the second stack walk, the second set of stack walking results representing at least one frame that is more recent than any frame traversed in the first stack walk;
installing, on the runtime stack, a second marker frame that marks a second boundary of stack frames represented by the second set of stack walking results.

19. The method of claim 18, further comprising:
subsequent to performing the second stalk walk of the runtime stack, performing a third stack walk of the runtime stack;
while traversing the runtime stack during the third stack walk, encountering the second marker frame;
responsive to encountering the second marker frame, retrieving the second cache of the second set of stack walking results;
completing the third stack walk without traversing at least one frame represented by the second set of stack walking results.

20. The method of claim 15, further comprising:
subsequent to performing the first stack walk of the runtime stack, unwinding a portion of the runtime stack;
while unwinding the portion of the runtime stack, encountering the first marker frame;
responsive to encountering the first marker frame, relocating the first marker frame to an older position in the runtime stack.

21. The method of claim 20, the operations further comprising:
subsequent to relocating the first marker frame to the older position in the runtime stack, performing a second stack walk of the runtime stack;
while traversing the runtime stack during the second stack walk, encountering the first marker frame;
responsive to encountering the first marker frame, determining that no cache corresponding to the older position in the runtime stack is available;
responsive to determining that no cache corresponding to the older position in the runtime stack is available, completing the second stack walk at least by traversing the runtime stack from the older position in the runtime stack to the root frame.

* * * * *